United States Patent
Yamamoto et al.

(10) Patent No.: US 7,748,094 B2
(45) Date of Patent: Jul. 6, 2010

(54) MOLDING INSTALLATION METHOD AND DEVICE

(75) Inventors: Tatsuhiko Yamamoto, Tochigi (JP); Takahiro Yogoro, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 11/720,446

(22) PCT Filed: Nov. 24, 2005

(86) PCT No.: PCT/JP2005/021513
§ 371 (c)(1),
(2), (4) Date: Jun. 7, 2007

(87) PCT Pub. No.: WO2006/059521
PCT Pub. Date: Jun. 8, 2006

(65) Prior Publication Data
US 2008/0047119 A1  Feb. 28, 2008

(30) Foreign Application Priority Data
Nov. 30, 2004 (JP) ............................. 2004-345174

(51) Int. Cl.
*B23P 19/04* (2006.01)
*B60J 10/00* (2006.01)
(52) U.S. Cl. ........................... 29/235; 29/283.5; 269/21
(58) Field of Classification Search .................. 29/235, 29/281.1, 281.3, 281.5, 283.5; 269/21
See application file for complete search history.

(56) References Cited

U.S. PATENT DOCUMENTS

| 4,183,511 | A | * | 1/1980 | Marek ........................ 269/17 |
|---|---|---|---|---|
| 4,715,110 | A |   | 12/1987 | Angelo et al. |
| 4,760,636 | A |   | 8/1988 | St. Angelo, Jr. et al. |
| 4,961,257 | A | * | 10/1990 | Sakamoto et al. ............. 29/823 |
| 5,018,264 | A | * | 5/1991 | Kautt ........................ 29/564.8 |
| 5,067,225 | A | * | 11/1991 | St. Angelo et al. ............ 29/451 |
| 5,301,411 | A | * | 4/1994 | Fujiwara et al. ............... 29/430 |
| 5,875,670 | A |   | 3/1999 | Stojkovski et al. |
| 7,039,995 | B2 | * | 5/2006 | Thompson ................. 29/281.5 |
| 7,310,865 | B2 | * | 12/2007 | Cole et al. ................. 29/281.5 |
| 2003/0051326 | A1 | * | 3/2003 | Lawson et al. .......... 29/407.01 |
| 2008/0047119 | A1 | * | 2/2008 | Yamamoto et al. ............ 29/235 |

FOREIGN PATENT DOCUMENTS

| CA | 1275430 | 10/1990 |
|---|---|---|
| CA | 2211611 | 1/1998 |
| EP | 0253599 | 1/1988 |
| EP | 0822019 | 2/1998 |
| JP | 5-200638 | 8/1993 |

(Continued)

*Primary Examiner*—Lee D Wilson
(74) *Attorney, Agent, or Firm*—Rankin, Hill & Clark LLP

(57) ABSTRACT

A device capable of smoothly, easily and automatically installing a molding on a door panel for an automobile is provided and includes a molding installation jig and a dynamic sensor located between a jig body and an arm. The dynamic sensor is designed to detect a force applied from the molding installation jig to the molding. A finger is supported on a side of the jig body to contact and hold an end section of the molding. Three suction pads, which communicate with a vacuum device, are provided on a surface of the jig body at equal intervals. A pair of brackets having a C-shaped cross section are provided on a side surface of the jig body, which is perpendicular to the surface on which the suction pads are provided. A first roller, a second roller, and a third roller 19 are rotatably supported in each of the brackets.

4 Claims, 5 Drawing Sheets

FOREIGN PATENT DOCUMENTS

| | | |
|---|---|---|
| JP | 5-065298 | 9/1993 |
| JP | 8-155843 | 6/1996 |
| JP | 8-174353 | 7/1996 |
| JP | 10-100681 | 4/1998 |
| JP | 10-166280 | 6/1998 |
| WO | 01/74541 | 10/2001 |

* cited by examiner

MOLDING INSTALLATION METHOD AND DEVICE

TECHNICAL FIELD

The present invention relates to an installation jig for automatically installing a molding (weather strip) on an upper end of a door panel of an automobile (outer panel or inner trim), an installation device (robot) provided with that installation jig at the tip of an arm and a method for installing the molding with the installation device.

BACKGROUND ART

As disclosed in Patent Literature 1, a molding (weather strip) is installed on upper ends of an outer panel and an inner trim configuring a door panel of an automobile; a lip section of the molding is brought into contact onto a window glass surface so that droplets and dusts will not enter the door panel in its inside at an occasion when the window glass is lowered.

As for the above described molding installation, automatic installation with a robot is carried out conventionally. That automatic installation is carried out by position control with a robot subjected to teaching of an installation position.

Patent Literature 1: Japanese Patent Application Publication No. 10-100681

As described above, conventionally a molding is installed by automatic installing with a robot. However, installation is carried out only by controlling the positions of the robot. Therefore, unreasonable force is applied to the molding and the automobile body which can be occasionally damaged. In order to avoid this, a dedicated device for detecting abnormal operations is required beside the installation robot, giving rise to cost increase and deterioration in workability.

DISCLOSURE OF THE INVENTION

In order to solve the above described problems, a molding installation jig according to the present invention comprises a suction pad for sucking a side surface of a molding; a finger brought into contact from the longitudinal direction of the molding; a roller for pressing the molding downward in order to fit the molding in a roller door panel and a roller for pressing the molding toward the inner side of an automobile body; and a dynamic sensor for detecting pressing force by those rollers, and a molding installation device is configured by providing the molding installation jig on respective tip sections of two arms which are driven independently.

A dynamic sensor detects pressing force applied to the molding, and thereby occurrence of an abnormal operation can be determined instantly. In addition, deformation of the molding shape can be treated easily. Therefore, one molding installation jig can carry out fitting of moldings in different shapes.

In addition, a roller for pressing a molding downward and a roller for pressing the molding toward the interior of an automobile body are used so as not to damage the molding. In addition, suction pads for sucking a side surface of a molding and a finger for pressing the molding in the longitudinal direction are used to facilitate installation and removal of a molding.

In addition, molding installation jigs are provided at the tips of two arms which are independently driven. With this, the attitude of the molding can be changed arbitrarily, which make is possible to fit the molding into the upper end of a door panel easily without interfering with the other members.

Also, according to a molding installation method by using the above described molding installation device, the dynamic sensor is used not to apply force of a predetermined value or more to a molding. Such a configuration enables a molding to smoothly fit into the upper end of a door panel.

According to the present invention, in order to install a molding onto the upper end of a door panel, the molding can be smoothly installed without damaging the molding or an automobile body with unreasonable force. In addition, the molding installation jig itself is smaller and lighter than conventional ones. Therefore, a device (robot) in which the molding installation jig is incorporated becomes compact.

Moreover, in a case where the shape of a molding or a door panel is changed, the installation device can be used only by inputting information thereof.

BEST MODE FOR CARRYING OUT THE INVENTION

Figure 1:
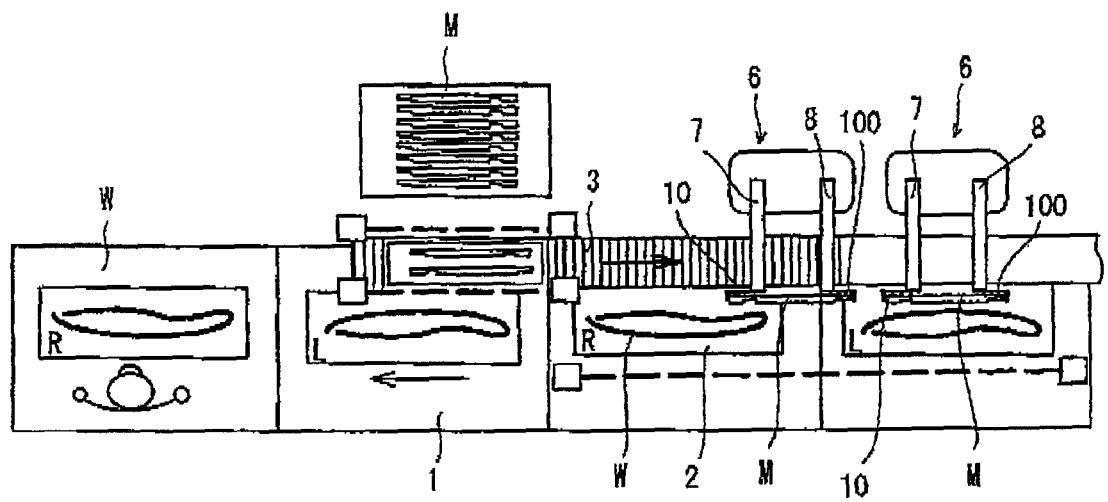
FIG. 1 is a plan view of a molding installation area where a molding installation device according to the present invention is applied.

Embodiments of the present invention will be described below with reference to the accompanying drawings. FIG. 1 is a plan view of a molding installation area where a molding installation device according to the present invention is applied, and there is provided an automobile door conveyance line 1. A pallet 2 is intermittently conveyed from right to left in the drawing along that conveyance line 1. A right side door W and a left side door W are alternately placed on each pallet 2.

A roller conveyer 3 is arranged along the automobile door conveyance line 1. A bucket 4 for stocking a molding is provided on a side of the roller conveyer 3, and a predetermined molding M is set on the pallet 5 from the bucket 4. In this embodiment, a pair of left and right moldings M are set on the pallet 5 so as to move from left to right on the roller conveyer 3 and the pallet 5 having been made vacant is caused to return to the original position (not illustrated in the drawing).

In addition, two molding installation devices 6 according to the present invention are arranged along the roller conveyer 3. One molding installation device 6 is for the right side door W. The other molding installation device 6 is for the left side door W.

Figure 2:
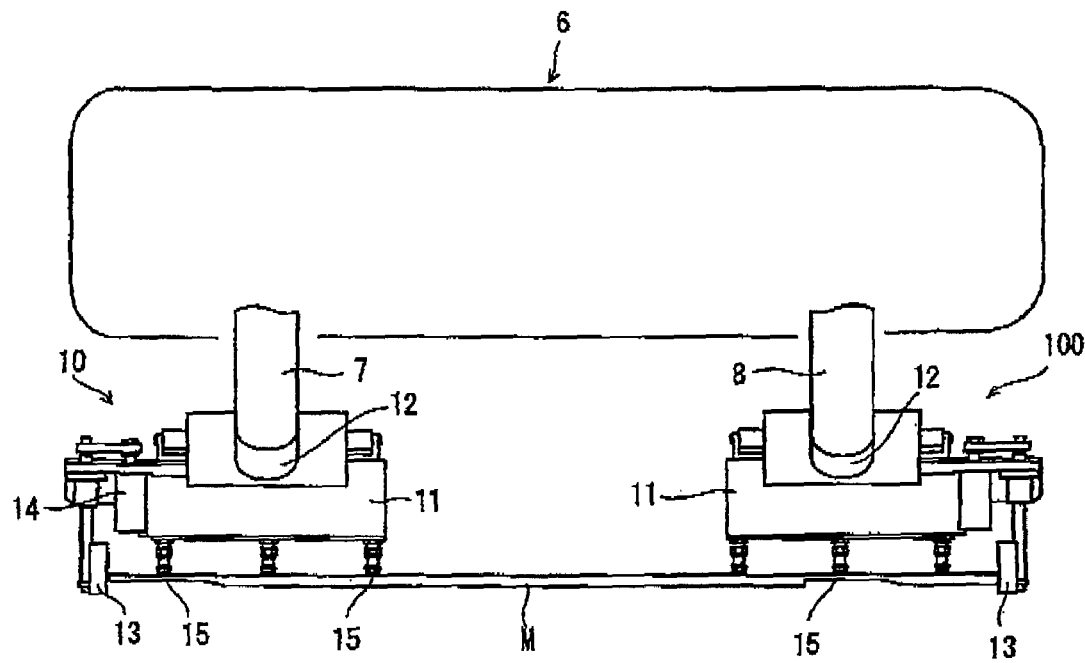
FIG. 2 is a plan view of the molding installation device.
Figure 3:
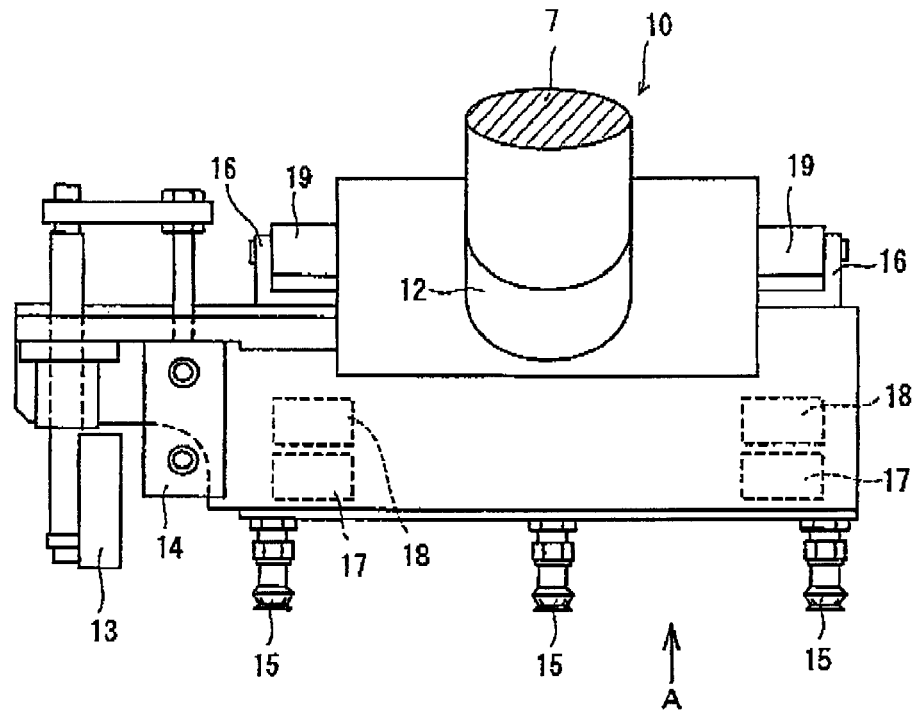
FIG. 3 is a plan view of a molding installation jig provided at a tip of an arm of the molding installation device.
Figure 4:
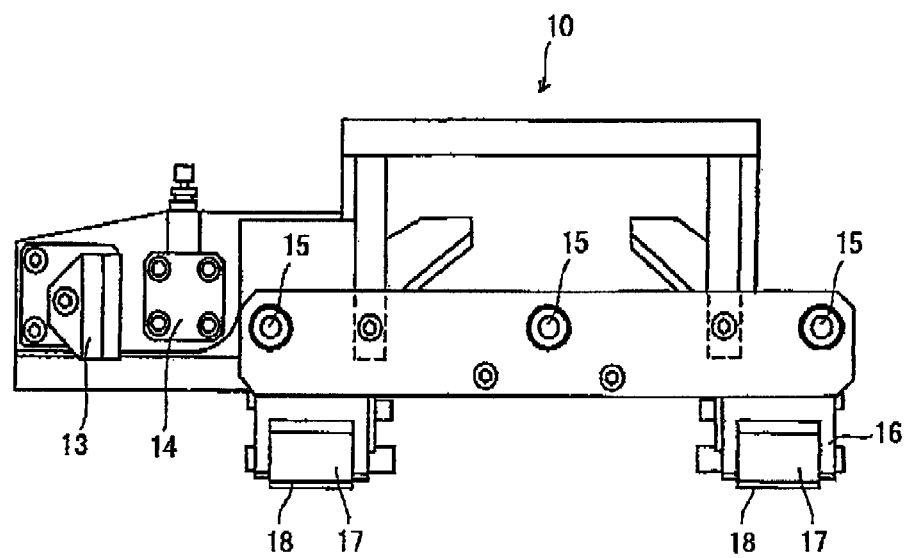
FIG. 4 is a view seen from A direction of FIG. 3.
Figure 5:
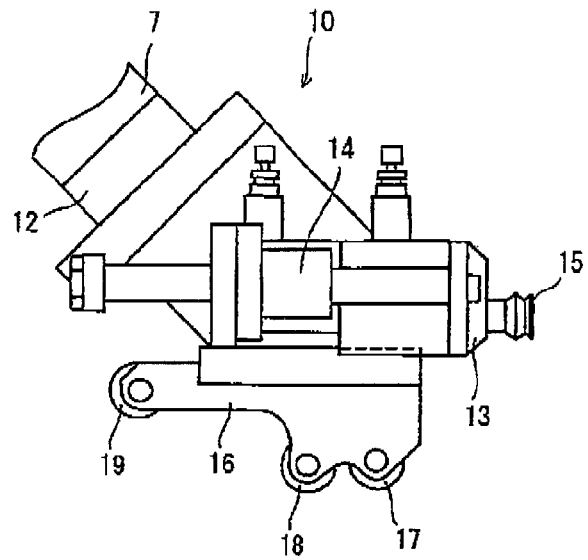
FIG. 5 is a view seen from B direction of FIG. 3.

Each of the molding installation devices 6 has molding installation jigs 10 and 100 provided on the tip section of two arms 7 and 8 which are driven independently. Since the molding installation jig 10 and the molding installation jig 100 are different only in the position of a finger for retaining the molding in the longitudinal direction, only the molding installation jigs 10 will be described in detail with reference to FIG. 2 to FIG. 5. FIG. 2 is a plan view of the molding installation device, FIG. 3 is a plan view of a molding installation jig provided at a tip of an arm of the molding installation device, FIG. 4 is a view seen from A direction of FIG. 3, and FIG. 5 is a view seen from B direction of FIG. 3.

The molding installation jig 10 has a dynamic sensor 12 between a jig body 11 and the arm 7. The dynamic sensor 12 is designed to detect force applied from the molding installation jig 10 to the molding M and recognize completion of work when the value thereof reaches a predetermined value.

A finger 13 is supported on a side of the jig body 11 as a means for contacting and holding an end section of the molding M. The finger 13 is linked to a cylinder unit 14 and moves forward and backward by driving the cylinder unit 14.

Also, three suction pads 15 communicating with a vacuum device are provided on a surface of the jig body 11 at equal intervals. The suction pads 15 protrude in the same direction as the forward and backward direction of the finger 13.

Further, a pair of brackets 16 having a C-shaped cross section are provided on a side surface of the jig body 11 which is perpendicular to the surface on which the suction pads 15 are provided. A first roller 17, a second roller 18, and a third roller 19 are rotatably supported in each of the brackets 16.

Figure 6:
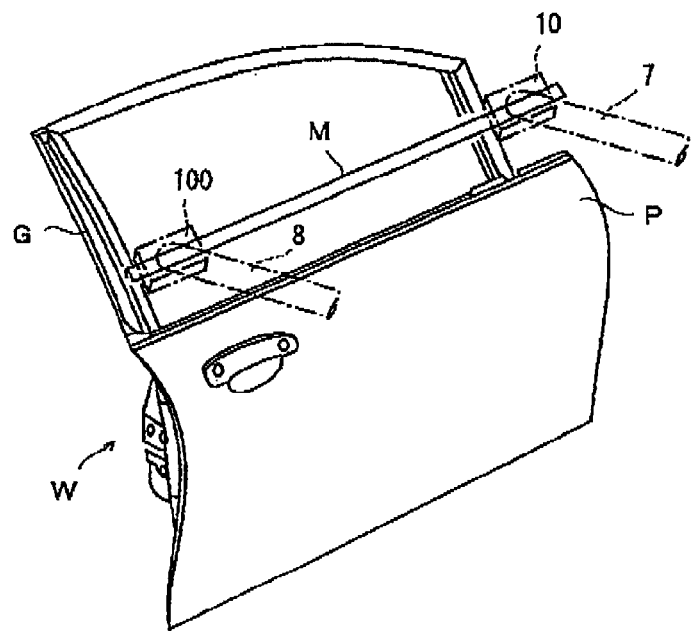
FIG. 6 is a view showing a first step among steps for installing a molding on a door panel.
Figure 7:
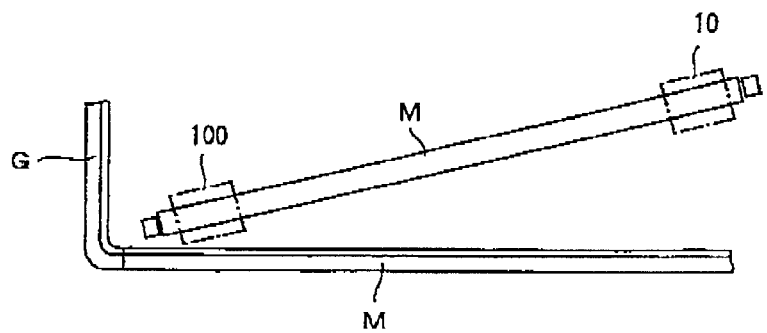
FIG. 7 is a view showing a state where an end of the molding is lowered.
Figure 8:
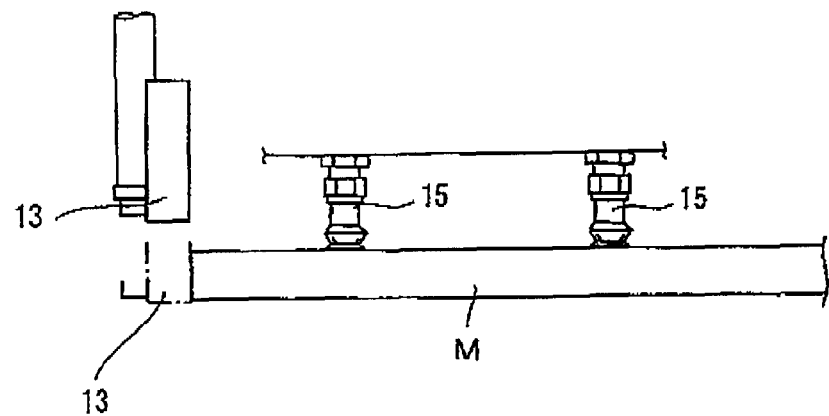
FIG. 8 is a view showing a state where a pressing finger of one molding installation jig is caused to retreat.
Figure 9:
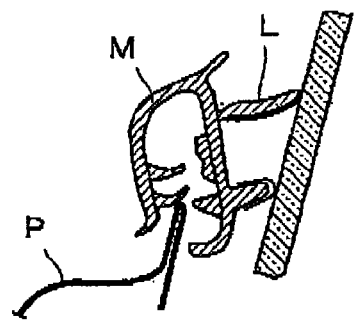
FIG. 9 is a sectional view showing a state where the molding is temporarily engaged.
Figure 10:
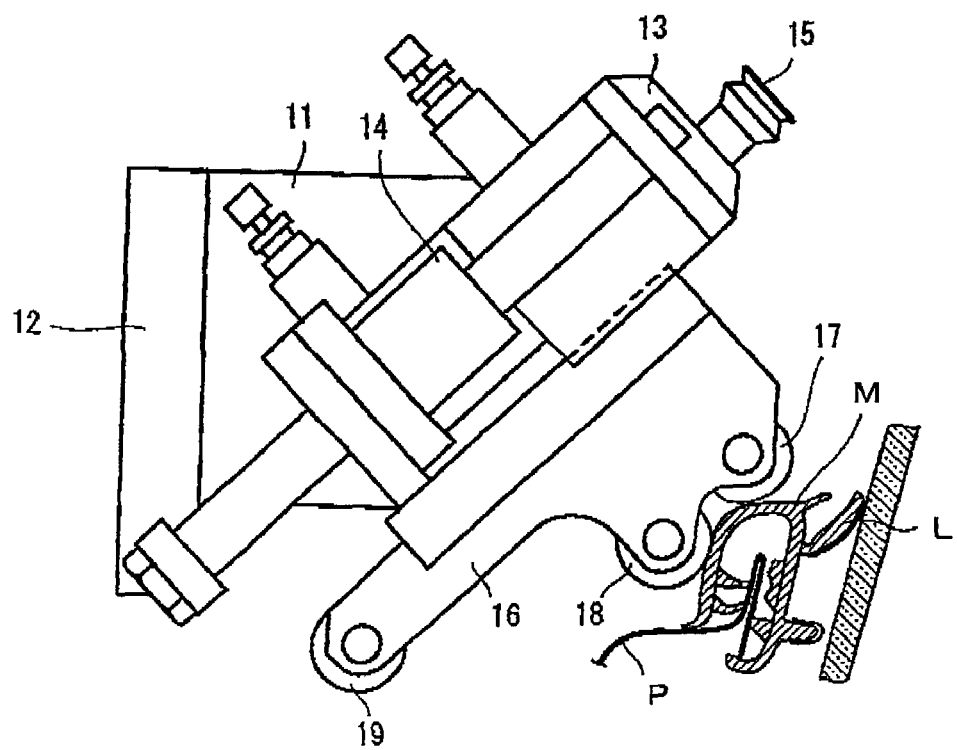
FIG. 10 is a sectional view showing a state where the molding is fit into the upper end of a door panel from the temporarily engaged state.

Next, with the molding installation device 6 configured as described above, a procedure of installing a molding M on an outer panel of a right side door W will be described with reference to FIG. 6 to FIG. 10. FIG. 6 is a view showing a first step among steps for installing a molding on a door panel, FIG. 7 is a view showing a state where an end of the molding is lowered, FIG. 8 is a view showing a state where a pressing finger of one molding installation jig is caused to retreat, FIG. 9 is a sectional view showing a state where the molding is temporarily engaged, and FIG. 10 is a sectional view showing a state where the molding is fit into the upper end of a door panel from the temporarily engaged state. Since a left side door undergoes the same operation, an explanation thereof will be omitted.

At first, the arms 7 and 8 are caused to come closer to each other. The fingers 13 of the left and right molding installation jigs 10 and 100 are brought into contact to the molding M from the longitudinal direction thereof as illustrated in FIG. 6. Further the suction pads 15 suck the both end sections of the molding M and thereby hold the molding M between the left and right molding installation jigs 10 and 100. In this instance, the molding M is substantially parallel to the upper end of an outer door panel P.

Subsequently, the arm 8 of the molding installation device 6 is lowered as illustrated in FIG. 7 to engage an end of the molding M with the outer door panel P. Further the arms 7 and 8 are moved to stick the end of the molding M on a garnish G. In this instance, the finger 13 of the molding installation jig 10 is in contact with an end of the molding M. Therefore, in the other end near to the garnish G, the finger 13 is retreated in advance as illustrated in FIG. 8. Incidentally, the end of the molding M is held by the suction pads 15 of the molding installation jig 100.

Subsequently, the arm 7 on which the molding installation jig 10 is provided is lowered to temporarily engage the entire molding M with the outer door panel P. FIG. 9 shows this state. That is, the upper end of the outer door panel P enters the molding M. A lip section L of the molding M is in contact with a window glass, and with its reaction force, the upper section of the molding M is inclined toward the outside of the automobile body.

From this state, the holding state with the finger 13 and the suction pads 15 is released; the arms 7 and 8 of the molding installation device 6 are operated to change the directions of the molding installation jigs 10 and 100, the first roller 17 is applied to the upper section of the molding M and the second roller 17 is applied to the side section of the molding M as illustrated in FIG. 10, and the molding M is pressed downward and toward the inside of the automobile body so as to be fit into the upper end of the outer door panel P.

Incidentally, the pressing direction of the molding M does not need to be precisely downward and sideward but can be in an oblique direction.

Force applied to the molding M at the time of being fit is detected with the dynamic sensor 12 all the time. When the applied force exceeds a predetermined value, the work is stopped. With this, it is possible to avoid a disadvantage that the molding M or the automobile body is damaged.

Figure 11:
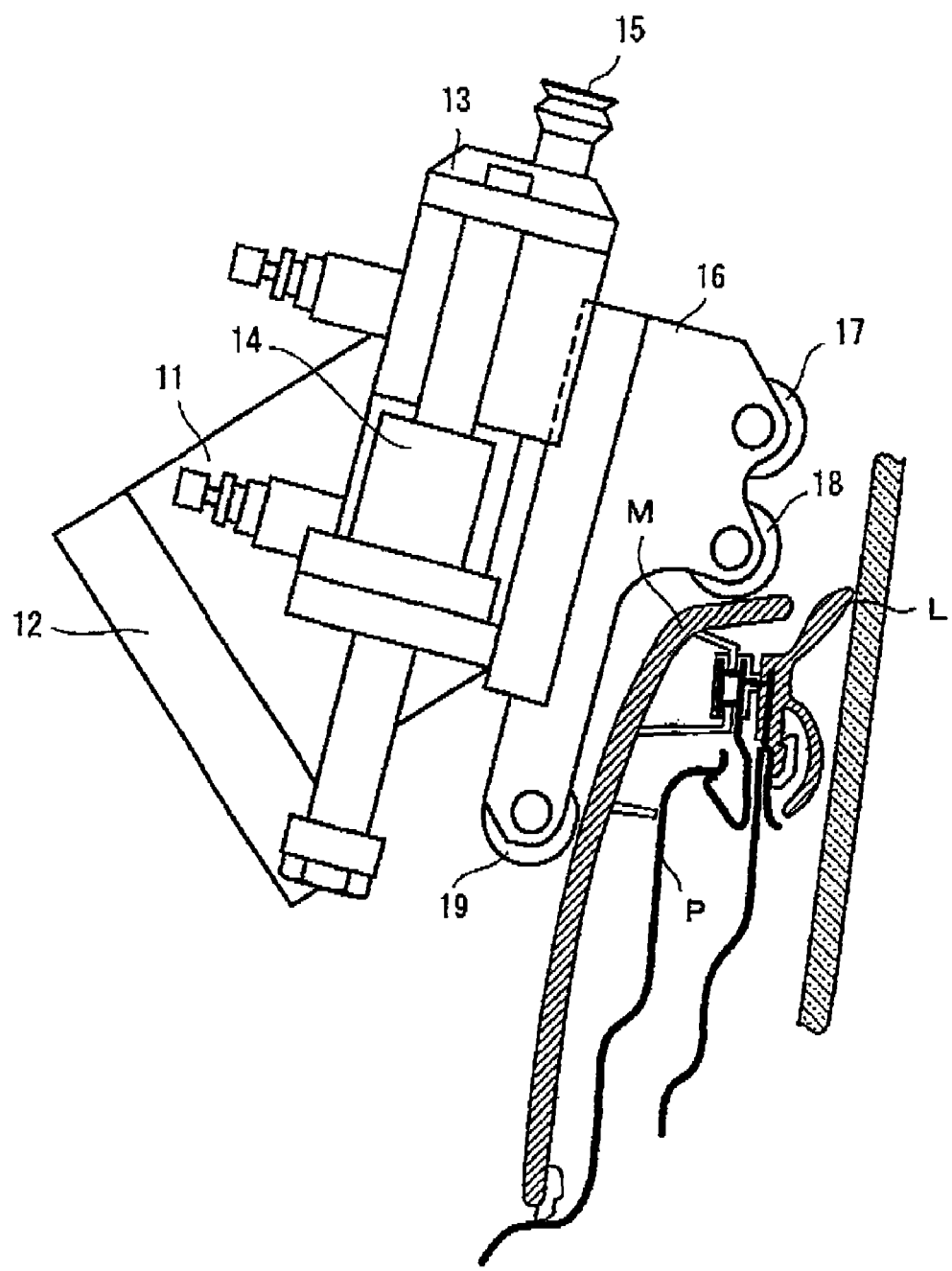
FIG. 11 is a diagram similar to FIG. 10 showing another embodiment.

FIG. 11 is a diagram similar to FIG. 10 showing another embodiment. In this embodiment, a molding M which is large in the vertical dimension is fit. In this case, the first roller 17 is not used. The molding M is fit in a state where the second roller 18 is brought into contact with the upper section of the molding M and the third roller 19 is brought into contact with the side section of the molding M.

In the drawings, the molding is provided at the upper end of the outer panel of the door. However, the present invention is also applicable to a case where the molding is provided at the upper end of an inner trim of the door.

The invention claimed is:

1. A molding installation device comprising:
   a rigidly mounted base;
   a first arm having one end attached to the base and a distal end extending outward from the base;
   a first molding installation jig attached to the distal end of the first arm;
   a second arm having one end attached to the base and a distal end extending outward from the base; and
   a second molding installation jig attached to the distal end of the second arm,
   wherein each molding installation jig comprises:
      a jig body;
      a finger attached to a side of the jig body and adapted to be moved into contact with a molding from a longitudinal direction of the molding;
      a suction pad attached to a surface of the jig body and adapted to hold a side surface of the molding;
      a first roller attached to the jig body and adapted to press the molding downward in order to fit the molding in a roller door panel;
      a second roller attached to the jig body and adapted to press the molding toward an inner side of an automobile body; and
      a pressure sensor to attached between the jig body and the distal end of the arm, wherein the pressure sensor detects a pressing force experienced by the rollers.

2. The molding installation device of claim 1 further comprising a third roller attached to the jig body and adapted to press a side section of the molding toward an outer door panel.

3. The molding installation device of claim 2, wherein installation of the molding is complete when the pressure sensor senses a predetermined value.

4. The molding installation device of claim 3, wherein the first arm and the second arm are driven independently of each other.

* * * * *